Figure 1:
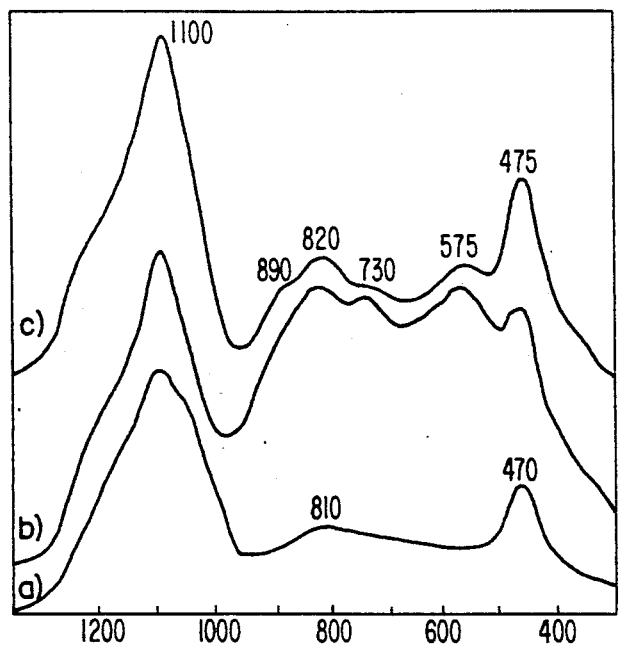

United States Patent [19]

Corral et al.

[11] Patent Number: 5,110,773
[45] Date of Patent: May 5, 1992

[54] METHOD FOR THE PRODUCTION OF BETA-SIALON BASED CERAMIC POWDERS

[75] Inventors: José S. M. Corral; Salvador De Aza, both of Madrid; Francisco M. Poyato, Alcala De Henares; Francisco J. Valle Fuentes, Madrid; Isabel O. Miranda, Madrid; Rafael M. Caseres, Madrid; Paz C. Martinez, Madrid, all of Spain

[73] Assignee: Union Explosivos Rio Tinto, S.A., Madrid, Spain

[21] Appl. No.: 440,781

[22] Filed: Nov. 22, 1989

Related U.S. Application Data

[63] Continuation of Ser. No. 185,907, Apr. 25, 1988, abandoned.

[30] Foreign Application Priority Data

Apr. 28, 1987 [ES] Spain .................................... 8701257

[51] Int. Cl.$^5$ ............................................. C04B 35/58
[52] U.S. Cl. ....................................... 501/98; 501/97; 423/327
[58] Field of Search .................... 501/97, 98; 423/327

[56] References Cited

U.S. PATENT DOCUMENTS

| | | |
|---|---|---|
| 3,960,581 | 6/1976 | Cutler ..................................... 501/98 |
| 4,243,621 | 1/1981 | Mori et al. .......................... 501/98 X |
| 4,360,506 | 11/1982 | Paris et al. .......................... 501/98 X |
| 4,460,528 | 7/1984 | Petrak et al. .................... 501/127 X |
| 4,499,193 | 2/1985 | Phelps et al. .......................... 501/98 |
| 4,511,666 | 4/1985 | Phelps et al. ...................... 501/97 X |
| 4,731,236 | 3/1988 | Murakawa et al. ............... 501/98 X |
| 4,977,113 | 12/1990 | Phelps et al. ......................... 501/98 |

FOREIGN PATENT DOCUMENTS 0023869 2/1981 European Pat. Off. .............. 501/98
504410 7/1981 Spain .

*Primary Examiner*—Karl Group
*Attorney, Agent, or Firm*—Ladas & Parry

[57] ABSTRACT

A method to obtain $\beta'$-sialon-based ceramic powders through carbo-thermal reduction in a nitrogen atmosphere at 1300°–1500° C. of pre-mullitic material with high specific surface and reactivity, the material having a crystalline phase with a formula of $3Al_2O_3 \cdot 2SiO_2$ and a proportion of displaced amorphous silica. The overall proportion $Al_2O_3/SiO_2$ range from 0.5 to 1.5 giving specific surfaces that are always higher than 50 m$^2$/g.

This product obtained has a major phase of $\beta'$-sialon with a formula of $Si_{6-z}Al_zN_{8-z}O_z$ (where $z=2.7$–$4.0$) and small proportions or traces of other phases such as $\alpha$-$Al_2O_3$, $\beta$-$N_4Si_3$ and polytypes.

5 Claims, 1 Drawing Sheet

METHOD FOR THE PRODUCTION OF BETA-SIALON BASED CERAMIC POWDERS

This is a continuation of co-pending application Ser. No. 185,907 filed Apr. 25, 1988 now abandoned.

Solid solutions of Si-Al-O-N systems with an $Si_{6-z}Al_zO_zN_{8-z}$ ($z=0-4$) composition and a structure similar to the $\beta$-$N_4Si_3$, are designated $\beta''$-sialons. They are of considerable interest in the field of ceramic materials with high thermal, mechanical and chemical resistance.

Powdered sialons or components made of them have been obtained in the past by different methods, either using varied raw materials or alternative methods of treating them. A fair number of these methods use silicon nitride as a raw material together with aluminium, alumina, silica, etc., and require very high temperatures and pressures. This fact and the high cost of using the above-mentioned nitrides has led to a search for other, less expensive raw materials to obtain $\beta'$-sialon. Thus, there have been descriptions of methods to obtain sialons from kandites and clays:

S. Wild, J. Mat. Sci. 11-P.1972(1976), describes how sialon powder can be obtained from metakaolin and a mixture of ammonia and nitrogen kept at 1400° C. for 24 h. The disadvantage of this method is that, because of the difficulty of achieving a sufficiently large contact area between the metakaolin and the ammonia, there are problems in obtaining commercial quantities of the product.

U.S. Pat. No. 3,960,581 sets out a method to obtain sialons, the first stage of which is the reaction of nitrogen, aluminium chloride and clay in the presence of carbon and rice husks. Polyurethane foam is added to expand the clay and thus increase the contact area. This stage requires a temperature of 1400° C. for 3-4 h. Actual $\beta'$-sialon phase occurs when the product of the first stage is subjected to a second stage of heat sinterization.

J. G. Lee, R. Casarini, Y. I. B. Cutler, conference paper Am. Cer. Soc., Oct. 3, 1975, describes a method to obtain sinterisable powder from the nitridation of clay in the presence of carbon at a temperature of 1450° C., using iron as a catalyst. The main disadvantage of this procedure is the introduction of iron impurities into the solid solution phase.

French Patent No. 2,4632,405 describes a method to obtain $\beta'$-sialon from kaolinitic clays with specific surface of 5 to 80 m²/g through nitridation with nitrogen in the presence of excess carbon. The process is assisted by the pyrolysis of a pore-inducing agent in an atmosphere of nitrogen. This increases the porosity of the material formed from the homogenization of a mixture of raw materials prior to nitridation. The pore-inducing agent is a lignitic material.

This method requires a final stage of nitridation at a temperature of 1400°-1600° C. for a period of 9 to 25 h.

It can be seen, therefore, that the main disadvantages of existing procedures using clays and kandites as base materials to obtain $\beta'$-sialon are as follows: the need to resort the pore-inducing agent and other agents in order to increase the contact area of the materials for nitridation; the need to use catalysts in order to avoid long periods of nitridation or additional high-temperature stages. The presence of such agents and catalysts may, furthermore, lead to the presence of undesirable impurities.

Figure 2:
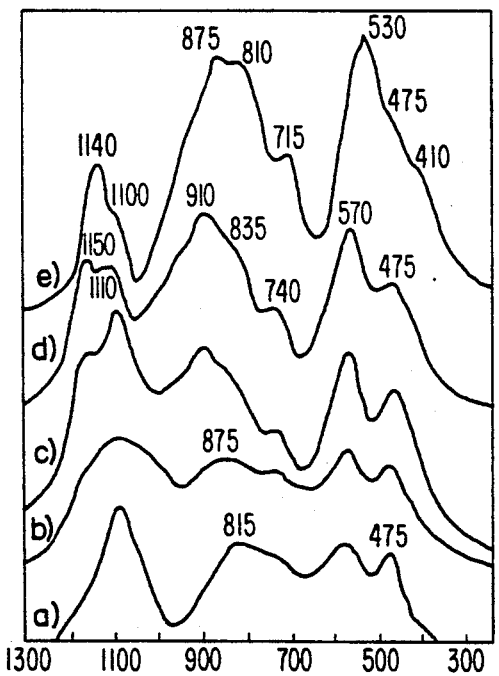
Figure 3:
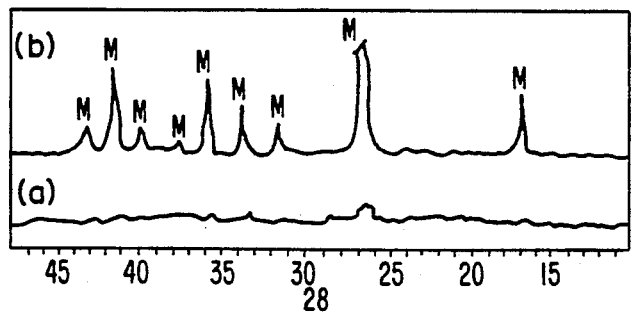

The following is a detailed description of embodiments of the invention, reference being made to the accompanying drawings, in which:

FIG. 1 shows the infra-red spectra for:
a. metakaolin
b. pre-mullite obtained from treatment of the former at 980° C.
c. pre-mullitic material obtained from treatment of the pre-mullite with strong alkalis FIG. 2 shows the evolution of the infra-red spectrum of a pre-mullitic material according to heat treatment received until it becomes a stable mullite, and FIG. 3 shows X-ray diffraction spectra for:
a. a pre-mullite material
b. mullite obtained from treatment of the former at a temperature of 1570° C. for 2.5 h.

The present invention relates to a method for obtaining $\beta'$-sialons by the carbo-thermal reduction of very reactive materials in an atmosphere of nitrogen.

Thanks to the use of raw material with a high specific area, this method does not require pore-inducing agent or the like, the process being carried out in relatively short periods of time at temperatures no higher than those of existing methods with good yields and adequate purity. In consequence, this process will be readily applicable in industry.

The base material for the process is a highly reactive transitional mullite hereinafter referred to as "pre-mullitic material". It is obtained by the method described in Spanish Patent No. 504,410 from kandites that are found in abundance in Spain and conform to the sequence:

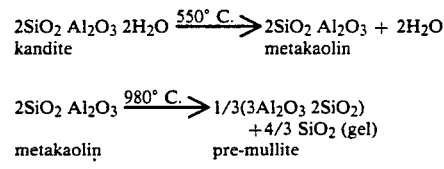

$$2SiO_2\ Al_2O_3\ 2H_2O \xrightarrow{550°\ C.} 2SiO_2\ Al_2O_3 + 2H_2O$$
kandite → metakaolin $$2SiO_2\ Al_2O_3 \xrightarrow{980°\ C.} 1/3(3Al_2O_3\ 2SiO_2) + 4/3\ SiO_2\ (gel)$$
metakaolin → pre-mullite The pre-mullite amorphous silica compound is then attacked with strong alkalis to eliminate the silica, yielding a material of extremely high specific surface, i.e. 50 to 400 m²/g depending on the extraction grade of the amorphous silica. The molar ratios $Al_2O_3/SiO_2$ may range from 0.5 to 1.5 in the pre-mullitic material.

Further characteristics of the pre-mullitic material obtained in this way are as follows:

A higher ratio than in mullite of tetrahedronically co-ordinated aluminiums to octahedronically co-ordinated aluminiums.

The high-resolution electron microscope shows the micro-morphology of the pre-mullitic powder to consist of tiny sheets of platelets in which the crystals of the pre-mullitic phase (about 10 nm in size) are homogeneously distributed, the spaces between them being filled with amorphous silica. This is what explains the increase in specific surface that is to be observed upon total or partial elimination of the amorphous silica through treatment with strong alkalis.

The remarkable porosity and homogeneity of the pre-mullitic material means that it is of great interest for use with catalysts and as a reactive material for various processes such as the present invention or in order to obtain dense bodies of mullite.

FIG. 1 shows the infra-red spectra for:
a. metakaolin b. pre-mullite obtained from treatment of the former at 980° C.

c. the final pre-mullitic material.

From the figure, it can be deduced that octahedronically co-ordinated aluminiums are present (absorption of 575 cm$^{-1}$ in (b) and (c)), while there is disappearance of the amorphous silica between (b) and (c) (reduction of absorption to 1100 and 475 cm$^{-1}$).

FIGS. 2 and 3 further illustrate the characteristics of the pre-mullitic material used as raw material in the process compared with mullite.

FIG. 2 shows the evolution of the infra-red spectrum of a pre-mullitic material as a function of heat treatment received until it becomes a stable mullite:

a. 1000° C./2 h.
b. 1100° C./2.5 h.
c. 1100° C./46 h.
d. 1200° C./2 h.
e. Standard mullite.

It can be seen that the transformation of pre-mullitic materials into dense mullite bodies is a continuous process.

This particular transformation has been the object of several studies: J. S. Moya, C. J. Serna and J. E. Inglesias, J. Mat. Sc. 20 (1985) 32-36; J. M. Rincon, G. Thomas and J. S. Moya, J. Am. Ceram. Soc., 69 2 C-29-C31 (1986); comparison has been made (FIG. 3) of (a) the X-ray diffraction spectra of the pre-mullitic material and (b) the mullite obtained from treatment of the former for 2.5 h at 157° C., clear difference being noted.

The method followed in this invention is carbo-thermal reduction of the pre-mullitic material in the presence of nitrogen at a reaction temperature of around 1350°-1500° C. (preferably 1400°-1450° C.):

pre-mullitic material

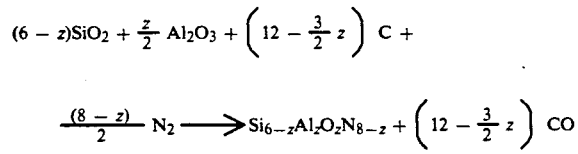

$$(6 - z)SiO_2 + \frac{z}{2} Al_2O_3 + \left(12 - \frac{3}{2} z\right) C +$$

$$\frac{(8 - z)}{2} N_2 \longrightarrow Si_{6-z}Al_zO_zN_{8-z} + \left(12 - \frac{3}{2} z\right) CO$$

z falling between 2.7 and 4.0, preferably between 2.9 and 3.5, depending on the ratio $Al_2O_3/SiO_2$ of the pre-mullitic material and the optional addition of further sources of silica.

Any finely ground ($\leq 1$ μm) carbon may be used as a carbon source, although it is advantageous to use lampblack, active carbons and other forms with a high specific surface.

The finely ground ($\leq 10$ μm) pre-mullitic material is homogenised with the carbon in a medium of low polarity before proceeding with the reaction.

Following homogenisation of the pre-mullite and carbon and the preparation of granules, pellets or powder made with them, the next stage is carbo-thermal reduction in an atmosphere of nitrogen.

This stage can be carried out in various types of furnace, including tunnel furnaces for continuous operation. Carbo-thermal reduction in the presence of nitrogen takes place at temperatures between 1350°-1500° C. (preferably 1400°-1450° C.) and pressures slightly above atmospheric.

Treatment times range from 0.5 to 6 h.

The product obtained consists primarily of a $\beta'$-sialon phase, accompanied by other phases such as $\alpha$-$Al_2O_3$, $\beta$-$N_4Si_3$ and certain polytypes, particularly 21R and 15R. Since there are no unwanted oxide or carbide phases, liquids can never be formed from the powder obtained during sintering and the product has, therefore, good applicability.

The proportion of $\beta'$-sialon can be brought up to over 80%, with variable quantities of $\alpha$-$Al_2O_3$, $\beta$-$N_4Si_3$ and polytypes.

EXAMPLES

Example 1

In order to obtain $\beta'$-sialon, a pre-mullite material obtained from calcination of Asturias kaolin rock at 1020° C. and subsequent treatment with 10% NaOH at 90° C. was used. The characteristics of the pre-mullitic material are indicated in Table 1:

TABLE 1

|  | WEIGHT (%) |
| --- | --- |
| Calcination loss (at 1100° C.) | 16.90 |
| $SiO_2$ | 37.40 |
| $Al_2O_3$ | 43.25 |
| $Fe_2O_3$ | 0.40 |
| $TiO_2$ | 1.86 |
| MgO | — |
| CaO | — |
| $Na_2O$ | 0.12 |
| $K_2O$ | 0.06 |
| Specific surface (m$^2$/g) | 250 |

The pre-mullitic material, reduced to a grain size of $\leq 5$ μm, was homogenised in isopropyl alcohol with an excess of 20% in relation to the theoretical amount of CALBLACK N-220 needed, immediately forming granules of some 2 g in weight.

The granules were then treated in a furnace with a tube of sintered alumina, a Pt-Rh 6%/Pt-Rh 30% thermocouple, a programmable system of temperature regulation and control, and a system for introducing nitrogen and extracting gases via the alumina tube.

Treatment conditions in the furnace were as follows:

| Rate of heating | 10° C./min. |
| --- | --- |
| Maximum temperature | 1425° C. |
| Nitrogen flux | 0.25 l/min. |
| Treatment time | 4 h. in one case and 6 h. in the other. |

Table 2 shows the phases of the product obtained together with their proportions (% weight):

TABLE 2

| Phase | Composition (% weight) | |
| --- | --- | --- |
|  | 4 h | 6 h |
| $\beta'$-sialon | 80 | 50 |
| $\alpha$-$Al_2O_3$ | 15 | 10 |
| Polytypes 21R and 15R | 2 | 35 |
| $\beta$-$N_4Si_3$ | 2 | 4 |
| TiN | 1 | 1 |

The presence of small quantities of TiN occurs because titanium is present in the original kaolin in the form of anatase. This remains in the pre-mullite and undergoes nitridation during the carbo-thermal reduction.

Example 2

In order to illustrate the positive advantages of using pre-mullitic material to obtain sialons rather than crude or calcined kandites, this example shows the results of carbo-thermal reduction in the presence of nitrogen for 4 h., following the same procedures and conditions as Example 1, for:
  a. Asturias rock kaolin
  b. Asturias rock kaolin calcined at 1020° C.

The composition of the products obtained is indicated in the following table:

TABLE 3

| | Composition | |
|---|---|---|
| Phase | From kaolin (a) | From kaolin (b) |
| $\beta'$-sialon | 45 | 45 |
| $\beta$-Si$_3$N$_4$ + polytype 21R | 15 | 15 |
| $\beta$-SiC | 14 | 15 |
| $\alpha$-Al$_2$O$_3$ | 13 | 14 |
| Mullite | 12 | 10 |
| TiN | 1 | 1 |

Comparison of Tables 2 and 3 clearly demonstrates the advantages of using pre-mullitic material rather than kandites. Where pre-mullitic material is not used, it can be observed that phases of mullite and $\beta$-SiC are formed and it is these which hinder application of the product obtained.

We claim:

1. A process for producing $\beta'$-sialon ceramic compounds having a formula $Si_{6-z}Al_zO_zN_{8-z}$, where $z = 2.7$ to 4, comprising the steps of:
  (a) providing a starting a material consisting of a premullitic material having the formula $$\tfrac{1}{3}(3Al_2O_3.2SiO_2) + (4/3 - n)SiO_2.$$

said premullitic material being formed by treating a premullite having a formula of $\tfrac{1}{3}(3Al_2O_3.2SiO_2) + 4/3SiO_2$ with a strong alkali to remove some of the SiO$_2$, where n equals the number of moles eliminated by the strong alkali, where the molar ratio of Al$_2$O$_3$ to SiO$_2$ in the premullitic material ranges between 0.5 and 1.5, and where the premullitic material has a specific surface ranging from greater than 50 m$^2$/g to 400 m$^2$/g and has a high degree of porosity;
  (b) finely grinding said premullitic material to a size of 10 $\mu$m or smaller;
  (c) homogenizing said finely ground premullitic material with finely ground carbon and without the addition of any pore inducing agents;
  (d) forming said mixture of finely ground premullitic material and said finely ground carbon into a shape; and
  (e) heating said shaped mixture in the presence of nitrogen.

2. The process according to claim 1, wherein said compound obtained comprises, at least, a $\beta'$-sialon phase in a proportion exceeding 80% by weight and the remainder being made of variable amounts of $\beta$-Si$_3$N$_4$, $\alpha$-Al$_2$O$_3$ and polytype phases.

3. The process according to claim 1 wherein in said homogenizing step, a medium having low polarity is added to said premullitic material and said carbon.

4. The process according to claim 1, wherein said heating step is carried out in the temperature range of 1350° C. to 1500° C.

5. The process according to claim 1, wherein said heating step is carried out for a period of time between 0.5 and 6 hours.

* * * * *